United States Patent
Hasan et al.

(10) Patent No.: US 10,717,511 B2
(45) Date of Patent: *Jul. 21, 2020

(54) AIRCRAFT SIDE OF BODY JOINT

(71) Applicant: The Boeing Company, Chicago, IL (US)

(72) Inventors: Zeaid Fouad Hasan, Mesa, AZ (US); Jeffrey F. Stulc, Seattle, WA (US); Phillip Roger Pratt, Gilbert, AZ (US); James A. Backlund, Jr., Bothell, WA (US); Nickolas Scott Ellerbeck, Salt Lake City, UT (US); Lyle Ray Deobald, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 484 days.

This patent is subject to a terminal disclaimer.

(21) Appl. No.: 15/432,193

(22) Filed: Feb. 14, 2017

(65) Prior Publication Data

US 2017/0152013 A1    Jun. 1, 2017

Related U.S. Application Data

(62) Division of application No. 13/962,974, filed on Aug. 9, 2013, now Pat. No. 10,479,475.

(51) Int. Cl.
  *B64C 1/06* (2006.01)
  *B64C 1/26* (2006.01)
  (Continued)

(52) U.S. Cl.
  CPC .............. *B64C 1/064* (2013.01); *B64C 1/061* (2013.01); *B64C 1/26* (2013.01); *B64C 3/182* (2013.01);
  (Continued)

(58) Field of Classification Search
  CPC .......... B64C 1/064; B64C 1/061; B64C 1/26; B64C 3/182; B64C 1/10; B64C 2001/0072; Y10T 156/1062; Y10T 29/49622
  (Continued)

(56) References Cited

U.S. PATENT DOCUMENTS 1,808,842 A * 6/1931 Fedor ........................ B64C 3/00
                                                         244/123.12
3,499,622 A    3/1970 Lugan et al.
(Continued)

FOREIGN PATENT DOCUMENTS

CN         101306722      11/2008
EP         1566334        8/2005
(Continued)

OTHER PUBLICATIONS

Office Action for Chinese Patent Application No. 201410335968.X dated Apr. 14, 2017 with English translation.
(Continued)

*Primary Examiner* — Benjamin P Lee
(74) *Attorney, Agent, or Firm* — Kunzler Bean & Adamson

(57) ABSTRACT

An aircraft includes a wing and a wing box. The wing is joined to the wing box at a side of body joint. The wing and the wing box each includes lower skin and a plurality of stringers on the skin. Ends of at least some of the stringers at the side of body joint have a web cutout and a base that is spanwise tapered to a knife edge at the skin.

20 Claims, 7 Drawing Sheets

(51) Int. Cl.
*B64C 3/18* (2006.01)
*B64C 1/10* (2006.01)
*B64C 1/00* (2006.01)

(52) U.S. Cl.
CPC ........ *B64C 1/10* (2013.01); *B64C 2001/0072* (2013.01); *Y10T 29/49622* (2015.01); *Y10T 156/1062* (2015.01)

(58) Field of Classification Search
USPC ........................................................ 244/119
See application file for complete search history.

(56) References Cited

U.S. PATENT DOCUMENTS

| | | | |
|---|---|---|---|
| 7,303,374 | B2 | 12/2007 | Li et al. |
| 7,954,763 | B2* | 6/2011 | Kulesha .................. B64C 3/187 244/123.1 |
| 8,302,908 | B1 | 11/2012 | Kismarton et al. |
| 8,347,579 | B2 | 1/2013 | Gan |
| 8,408,493 | B2 | 4/2013 | Barnard et al. |
| 2006/0070340 | A1 | 4/2006 | Fanucci et al. |
| 2007/0039284 | A1 | 2/2007 | Munoz Royo et al. |
| 2009/0136294 | A1 | 5/2009 | Porter et al. |
| 2009/0321575 | A1 | 12/2009 | Barroso et al. |
| 2011/0278395 | A1 | 11/2011 | Telgkamp et al. |
| 2011/0284693 | A1* | 11/2011 | Barnard .................. B64C 1/064 244/132 |
| 2012/0001024 | A1* | 1/2012 | Cruz Dominguez ... B64C 1/064 244/119 |
| 2012/0061512 | A1 | 3/2012 | Stulc et al. |
| 2012/0100343 | A1 | 4/2012 | Borghini-Lilli et al. |
| 2012/0132748 | A1* | 5/2012 | Axford ..................... B64C 3/26 244/119 |
| 2012/0292446 | A1 | 11/2012 | Kamarj et al. |
| 2013/0089712 | A1 | 4/2013 | Kwon et al. |
| 2013/0101801 | A1 | 4/2013 | Ruiz et al. |
| 2013/0112812 | A1 | 5/2013 | Kismarton |
| 2013/0287995 | A1 | 10/2013 | Deobald et al. |
| 2013/0337207 | A1* | 12/2013 | Mueller ................ B29C 70/326 428/36.4 |

FOREIGN PATENT DOCUMENTS

| | | |
|---|---|---|
| EP | 2457824 | 5/2012 |
| GB | 484305 | 5/1938 |
| GB | 565107 | 11/1944 |
| JP | 2012-532785 | 12/2012 |
| JP | 2012532785 | 12/2012 |
| JP | 2013-527075 | 6/2013 |
| JP | 2013527075 | 6/2013 |
| WO | 2011003844 | 1/2011 |
| WO | 2013074174 | 5/2013 |

OTHER PUBLICATIONS

Decision to Grant Patent concerning Japanese Patent Application No. 2014-153449 dated Jan. 8, 2019.
Office Action for Japanese Patent Application No. 2014-153449 dated May 15, 2018 with English translation.
Owen et al., Tension Pull-off and Shear Test Method to Characterize 3-D Textile Reinforced Bonded Composite Tee-Joiunt, American Society for Testing and Materials, pp. 398-409 (2001).
Office Action dated Apr. 23, 2015 for Canadian Application No. 2,850,791.
Extended European Search Report for EP Application No. 14179757.1 dated Jan. 7, 2015.
Office Action concerning Russian Patent Application No. 2014132455/ 11(052273) dated Apr. 13, 2018.
Office Action for Korean Patent Application No. 10-2014-0063168 dated Feb. 17, 2020.

* cited by examiner

AIRCRAFT SIDE OF BODY JOINT

BACKGROUND

A wing assembly of an aircraft may include a central wing box and wings cantilevered from sides of the central wing box. The central wing box carries bending loads applied by each wing during flight.

A "side of body joint" refers to that portion where a wing is joined to the central wing box. A typical side of body joint provides a chordwise splice of the wing to the central wing box, and it provides primary attachment of the wing to the aircraft's fuselage.

Due to the importance of this joint, and due to complex loading on it during flight, a robust design is highly desirable.

SUMMARY

According to an embodiment herein, an aircraft includes a wing and wing box. The wing is joined to the wing box at a side of body joint. The wing and the wing box each includes lower skin and a plurality of stringers on the skin. Ends of at least some of the stringers at the side of body joint have a web cutout and a base that is spanwise tapered to a knife edge at the skin.

According to another embodiment herein, an aircraft wing assembly comprises a central wing box, first and second wings, and splice chords for joining the wings to opposite sides of the wing box. The central wing box includes lower skin and stringers on the skin. Each wing includes lower skin and stringers on the skin. At least some stringer terminations have web cutouts and bases that are spanwise tapered to a knife edge at the skin.

According to another embodiment herein, a beam for an aircraft comprises a base and a web. The web has a cutout and the base is tapered to a knife edge at an end of the stringer. The tapered base extends longitudinally downward from the cutout at an angle between 10 and 15 degrees.

According to another embodiment herein, a method comprises machining an aircraft stringer having a web and a base. The machining includes forming a load-redistributing cutout in the web at an end of the stringer, and forming a longitudinal taper in the base at the end of the stringer. The taper goes from full height of the base to a knife edge at an angle between 10 and 15 degrees.

These features and functions may be achieved independently in various embodiments or may be combined in other embodiments. Further details of the embodiments can be seen with reference to the following description and drawings.

DETAILED DESCRIPTION

Figure 1:
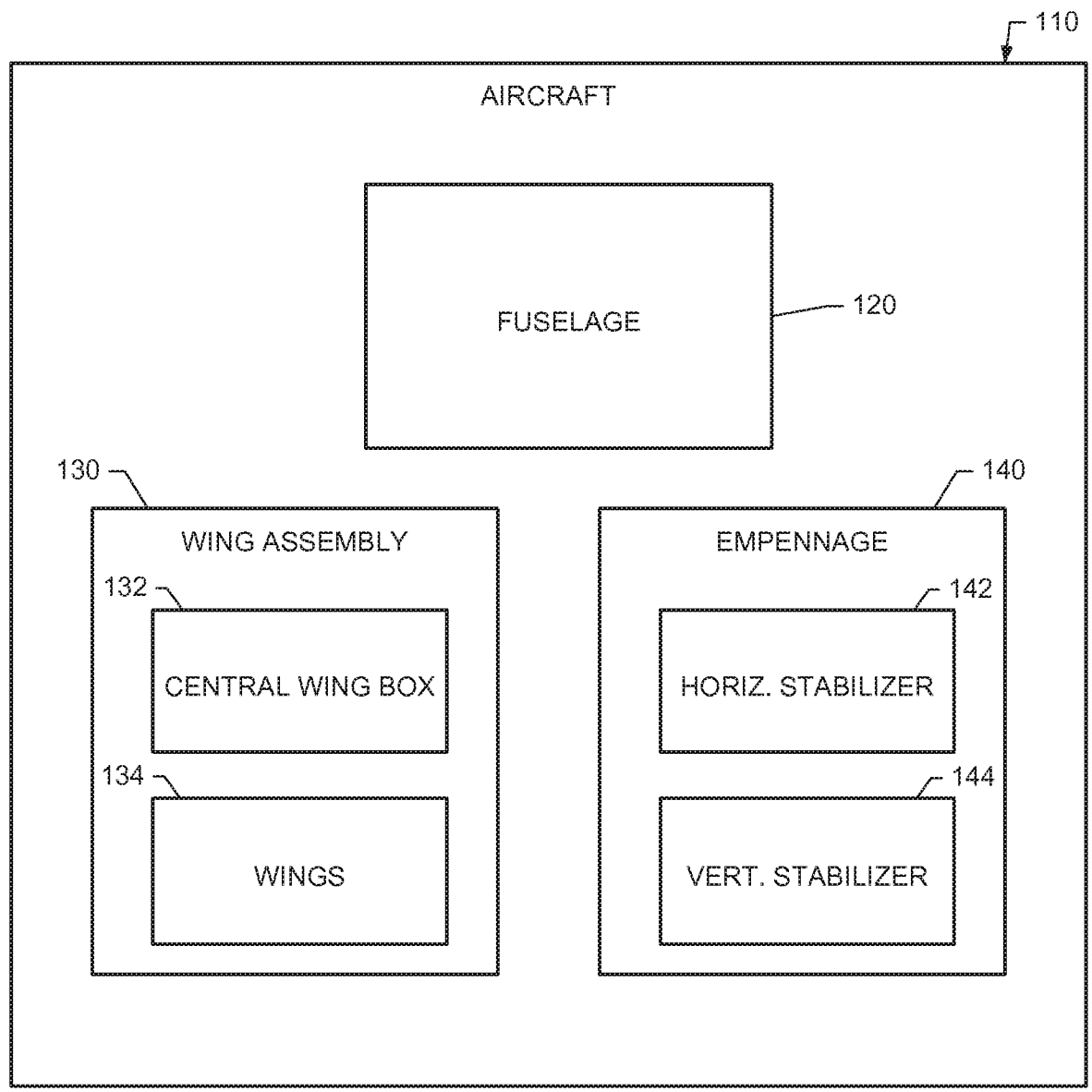
FIG. 1 is an illustration of an aircraft.

Reference is made to FIG. 1, which illustrates an aircraft 110 including a fuselage 120, a wing assembly 130, and empennage 140. In some embodiments, such as the embodiment illustrated in FIG. 1, the wing assembly 130 includes a central wing box 132 and wings 134 cantilevered from opposite sides of the central wing box 132. The central wing box 132 carries loads applied by each wing 134 during flight. The central wing box 132 may also provide other functions, such as storing a central fuel tank, and providing a well for landing gear.

The central wing box 132 and the wings 134 each include front and rear spars extending in a spanwise direction, ribs extending between the spars in a chordwise direction, upper and lower skin covering the spars and ribs, and upper and lower stringers for stiffening the upper and lower skin. The stringers also extend in a spanwise direction.

Figure 2A:
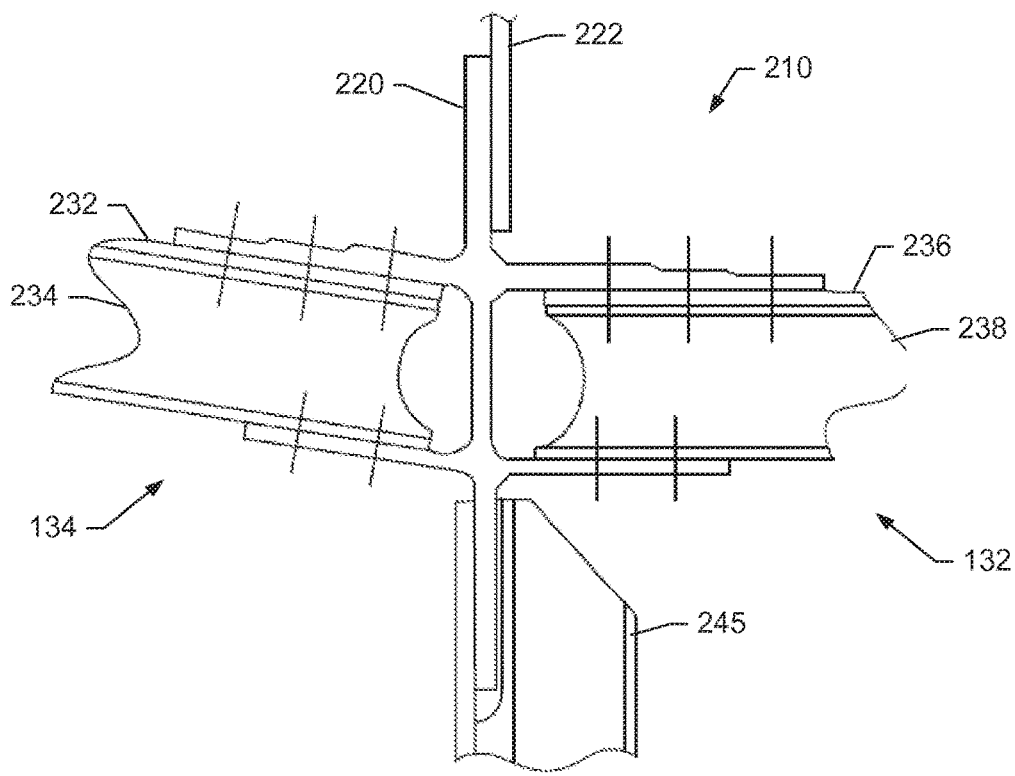
FIG. 2A is an illustration of an upper side of body joint of an aircraft.
Figure 2B:
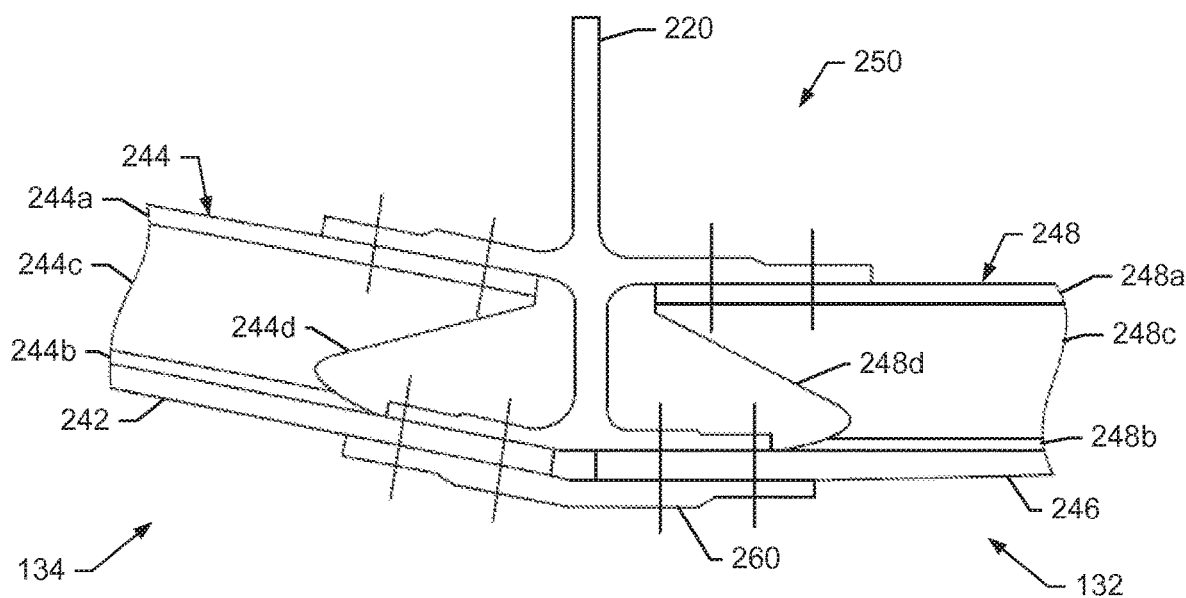
FIG. 2B is an illustration of a lower side of body joint of an aircraft.

Each wing 134 is joined to the central wing box 132 at a side of body joint. FIGS. 2A and 2B illustrate an example of a side of body joint. FIG. 2A illustrates an upper portion of the side of body joint (the "upper side of body joint"), and FIG. 2B illustrates a lower portion of the side of body joint (the "lower side of body joint"). The upper side of body joint is compression-critical, and the lower side of body joint is tension-critical. As the wing 134 bends upward, elements of the upper side of body joint 210 are forced together, while elements in the lower joint 250 are pulled apart. The upper and lower joints may be connected by side of body ribs.

Referring to FIG. 2A, the upper side of body joint 210 includes a splice chord 220. Upper wing skin 232 and upper stringers 234 of a wing 134 are fastened to an outboard side of the splice chord 220. Upper wing skin 236 and upper stringers 238 of the central wing box 132 are fastened to an inboard side of the splice chord 220. The splice chord 220 is also fastened to skin 222 of the fuselage 120 and also to a side of body rib 245.

Referring to FIG. 2B, the lower side of body joint 250 includes the splice chord 220. Lower wing skin 242 and lower stringers 244 of the wing 134 are fastened to the outboard side of the splice chord 220. Lower wing skin 246 and lower stringers 248 of the central wing box 132 are fastened to the inboard side of the splice chord 220. In the example illustrated in FIG. 2B, cap flanges (hereinafter "caps") 244a and 248a of the lower stringers 244 and 248 are fastened to the splice chord 220, and the lower skin 242, 246 is fastened to the splice chord 220. An external splice plate 260 may also be used to fasten the lower skin 242, 246 to the splice chord 220.

Base flanges (hereinafter "bases") 244b and 248b of the lower stringers 244, 248 are joined (e.g., fastened, bonded) to the lower skin 242, 246. There is a gap between the end of each base 244b and the splice chord 220, and there is a gap between the end of each base 248b and the splice chord 220.

The lower stringer 244 in the wing 134 includes a web 244c between its cap 244a and base 244b. The end of the web 244c has a web cutout 244d, and the end of the base 244b is spanwise tapered to a knife edge at the lower wing skin 242.

The lower stringer 248 in the central wing box 132 includes a web 248c between its cap 248a and base 248b. The end of the web 248c has a cutout 248d, and the end of the base 248b is spanwise tapered to a knife edge at the lower skin 246.

The tapered bases 244b and 248b transfer loads more gradually from the lower stringers 244 and 248 into the lower skin 242 and 246 to reduce the abrupt geometric discontinuities across the stringer ends. The tapered bases 244b and 248b prevent delamination of the lower stringers 244, 248 from the lower skin 242, 246.

The web cutout 244d in the lower stringer 244 of the wing 134 performs a different role than the web cutout 248d in the lower stringer 248 of the central wing box 132. Due to a difference in centroid alignment between both the wing side and the wing box side, the loads tend to be redistributed differently, causing secondary moments at the stringer termination as well as the stringer cap. The web cutouts 244d in the wing stringers 244 of the wing 134 redistribute vertical pulloff loads. The web cutouts 248d in the lower stringers 248 of the central wing box 132 place the stringer base ends in compression, which keeps those lower stringers 248 from peeling from the lower skin 246. Since these web cutouts 244d and 248d perform different functions, the web cutouts 244d in the lower stringers 244 of the wing 134 may have different shapes than the cutouts 248d in the lower stringers 248 of the central wing box 132.

FIGS. 2A and 2B illustrate only a single upper stringer 234 and a single lower stringer 244 for the wing 134, and only a single upper stringer 238 and a single lower stringer 248 for the central wing box 132. However, the wing 134 includes additional upper and lower stringers 234 and 244 spaced apart along the chordwise direction, and the central wing box 132 includes additional upper and lower stringers 238 and 248 spaced apart along the chordwise direction. Some or all of the lower stringers 244 in the wing 134, and some or all of the lower stringers 248 in the central wing box 132 may have the web cutout and tapered base. One or both of these features may be excluded from a stringer 244 or 248 where appropriate.

The splice chord 220 in the lower side of body joint 250 is not limited to a double plus chord type. For example, the splice chord 220 could be a one-piece plus chord or a T chord.

Figure 3:
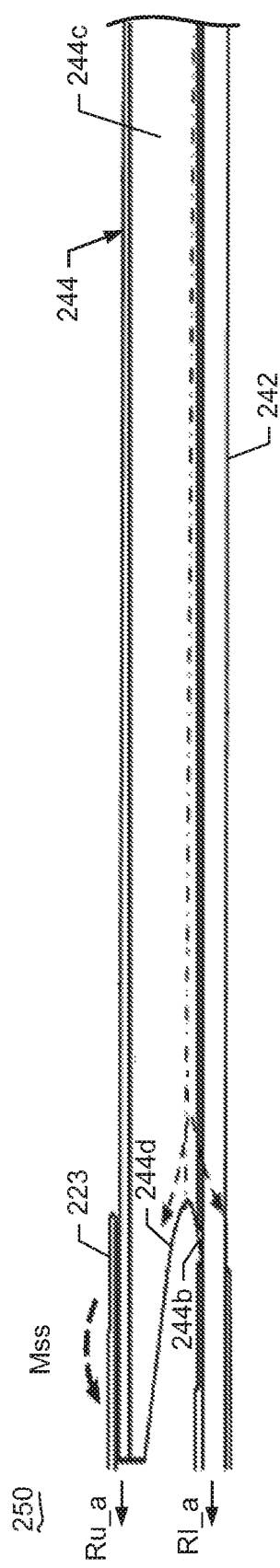
FIG. 3 is an illustration of loads at issue for skin and stringers in the lower side of body joint.

FIG. 3 illustrates the loads at issue for the lower skin 242 and stringer 244 at the lower side of body joint 250 for the wing 134. Total stringer axial load is split between a tab 223 of the splice chord (load Ru_a) and the skin 242 (load Rl_a). The primary mechanism for disband in the bondline between the skin 242 and the stringer 244 is local eccentricity developed in the stringer termination. The tapered base 244b helps to manage the local eccentricity at the bondline. A moment (Mss) developed from single shear eccentricity of the tab 223 attachment is the primary source for vertical pulloff loads in the web 244c. The web cutout 244d reduces the peak vertical pulloff loads by redistributing the loads in the stringer web 244c.

The web cutout is not limited to any particular geometry, so long as the web cutout extends beyond the end of the base. Curvature of the cutout may be simple or compound. Different cutouts having simple curvature are illustrated in FIGS. 4 and 5.

Figure 4:
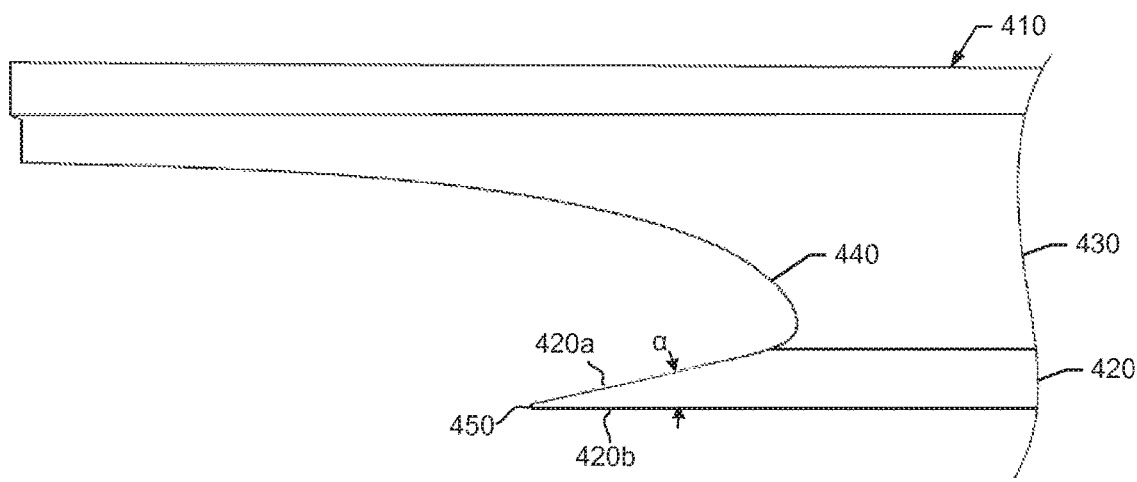
FIG. 4 is an illustration of a first example of a stringer having a web cutout and tapered base.

Reference is now made to FIG. 4, which illustrates a first example of a stringer 410 having a tapered base 420 and a web 430 with a cutout 440. This type of cutout 440 may be referred to as a "fishmouth" cutout. The taper of the base 420 starts from the cutout 440 and terminates in a knife edge 450. This stringer 410 may be used in either the wing or wing box.

Figure 5:
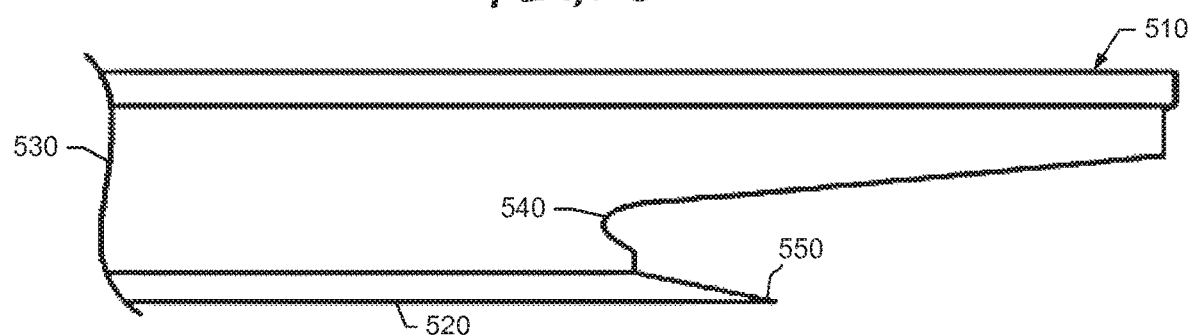
FIG. 5 is an illustration of a second example of a stringer having a web cutout and tapered base.

Reference is now made to FIG. 5, which illustrates a second example of a stringer 510 including a tapered base 520 and a web 530 having a web cutout 540. The web cutout 540 is roughly semicircular. In this example, the taper of the base 520 does not start at the web cutout 540. Rather, the web 530 drops down from the web cutout 540 to a full height base. The taper of the base 520 starts from the full height and terminates in a knife edge 550. This stringer 510 may be used in either the wing or wing box.

The curvature is not limited to the simple curvature illustrated in FIGS. 4 and 5. Other examples of a simple curvature include, but are not limited to, concave and parabolic curvature.

In some embodiments, the curvature may be compound. An example of a web cutout having a compound curvature is provided in assignee's US Publication 20110284693.

Reference is once again made to FIG. 4, which defines the angle of the taper as the angle (a) formed by the tapered surface 420a and the lower surface 420b of the tapered base 420. The angle (a) of the taper is not limited to any particular angle. However, the applicants have found that an angle (a) between 10 and 15 degrees is most effective at reducing eccentricities across a stringer termination.

The taper is not limited to a straight taper. In some embodiments, the taper may be radiused or compound.

In some embodiments, the tapered bases of the stringers in the wing may have different angles than the tapered bases of the stringers in the central wing box. In other embodiments, the angles may be the same.

Figure 6:
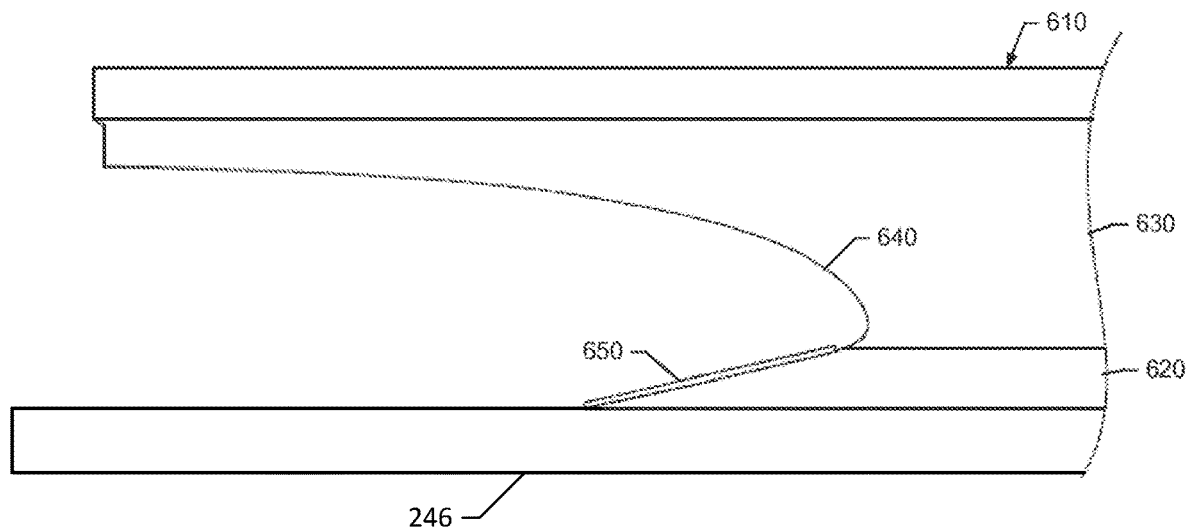
FIG. 6 is an illustration of a third example of a stringer having a web cutout and with overwrap layer on a tapered base.

Reference is now made to FIG. 6, which illustrates another example of a stringer 610 having a tapered base 620 and a web 630 with a cutout 640. In this example, however, an overwrap layer 650 is bonded to the tapered surface of the tapered base 620. The overwrap layer 650 may be made of sheet metal or plies of reinforcing fibers that are pre-impregnated with resin. The overwrap layer 650 may cover the entire tapered surface of a substantial portion thereof. The overwrap layer 650 functions to constrain the end of the tapered base 620 from peeling off the skin.

The stringers are not limited to any particular cross-section. For example, the stringers have an I-shaped or T-shaped cross-section.

Figure 7:
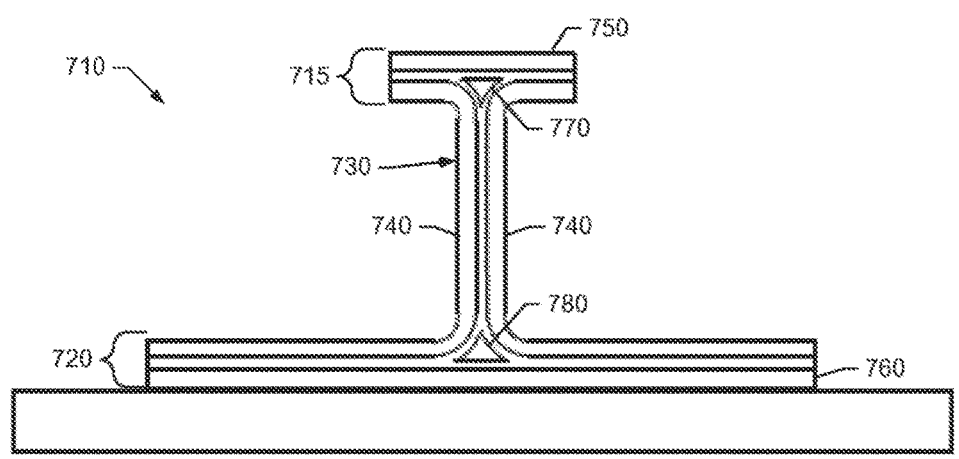
FIG. 7 is an illustration of a stringer including a noodle having a tapered base.

Reference is now made to FIG. 7, which illustrates a cross-section of an example of a stringer 710 having a cap 715, tapered base 720 (the taper is not shown), and a web 730 with a cutout (the cutout is not shown). The stringer 710 of FIG. 7 has an I-shaped cross-section, which is formed by back-to-back C-channel beams 740. Webs of the beams 740 may be bonded together by adhesive. Cap flanges of the beams 740 may be bonded to a cap plate 750 to form the cap 715, and base flanges of the beams 740 may be bonded to a base plate 760 to form the base 720. The stringer 710 further includes structures known as "noodles." A cap noodle 770 is filler material between the radiused portions of the cap flanges, and a base noodle 780 is filler material between the radiused portions of the base flanges. The end of the base noodle 780 conforms to the taper of the base 720 (the taper of the base noodle 780 is not shown in FIG. 7).

Figure 8:
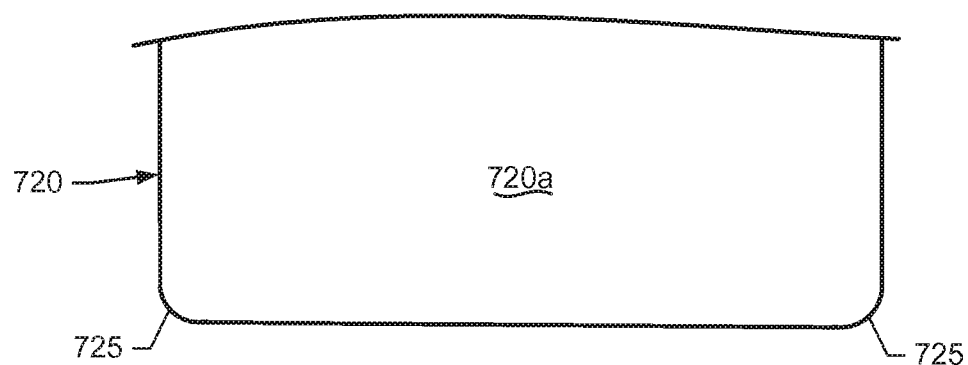
FIG. 8 is an illustration of the tapered base of the stringer of FIG. 7.

Additional reference is now made to FIG. 8, which illustrates the tapered base 720 of the stringer 710 (looking down on the tapered surface 720a of the tapered base 720). Corner ends 725 of the tapered base 720 are rounded or filleted. The rounded or filleted corner ends 725 prevent cracks from initiating and causing disbanding of the stringer 710 from the skin.

Figure 9:
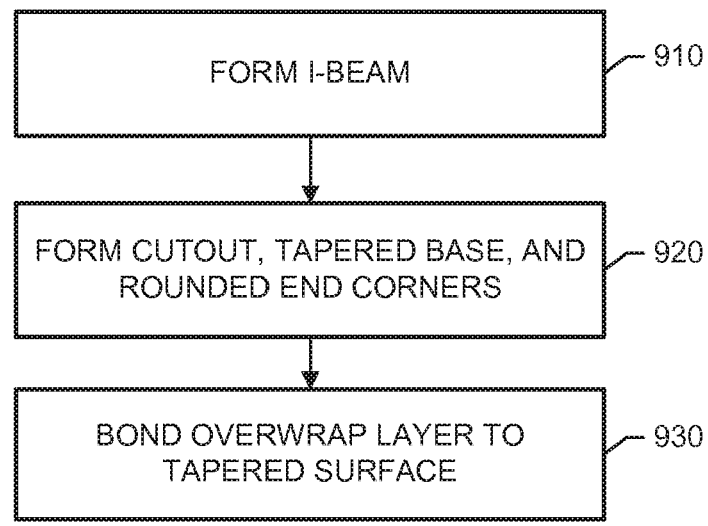
FIG. 9 is an illustration of a method of fabricating the stringer of FIG. 7.

Reference is now made to FIG. 9, which illustrates a method of fabricating the stringer 710 of FIG. 7. At block 910, the C-channel beams 740, cap and base plates 750 and 760, and cap and base noodles 770 and 780 are bonded together to form an I-beam. These elements 740-780 may be made of metal, fiber-reinforced composite, or a combination of the two.

At block 920, the web cutout is formed, and an end of the base 720 is tapered, for example, by machining. During the tapering of the base 720, the base noodle 780 is also tapered. In addition, the end corners 725 of the tapered base 720 may be machined so as to be rounded or filleted.

At block 930, an overwrap layer is bonded to the tapered surface. For example, fabric for plies of the overwrap layer is cut, and adhesive is placed between the tapered surface of the base flange and a faying surface of the uncured overwrap layer. The stringer 710, including the overwrap layer, is heated under pressure.

A wing assembly herein is not limited to a central wing box. The use of the web cutout and tapered base may be beneficial for stringers subject to high pull-off loads.

The wings of the wing assembly may have a dihedral and sweep. However, a wing assembly herein is not so limited.

A stringer herein is not limited to a wing assembly. Stringers having tapered bases and web cutouts may also be used in the empennage and fuselage of an aircraft.

With reference once again to FIG. 1, the empennage 140 includes horizontal and vertical stabilizers 142 and 144. Each stabilizer 142 and 144 includes a torsion box and at least one wing joined to the torsion box. The wing and the torsion box each includes skin and a plurality of stringers on the skin. Ends of at least some of the stringers at wing-torsion box joint have a web cutout and a tapered base.

Figure 10:
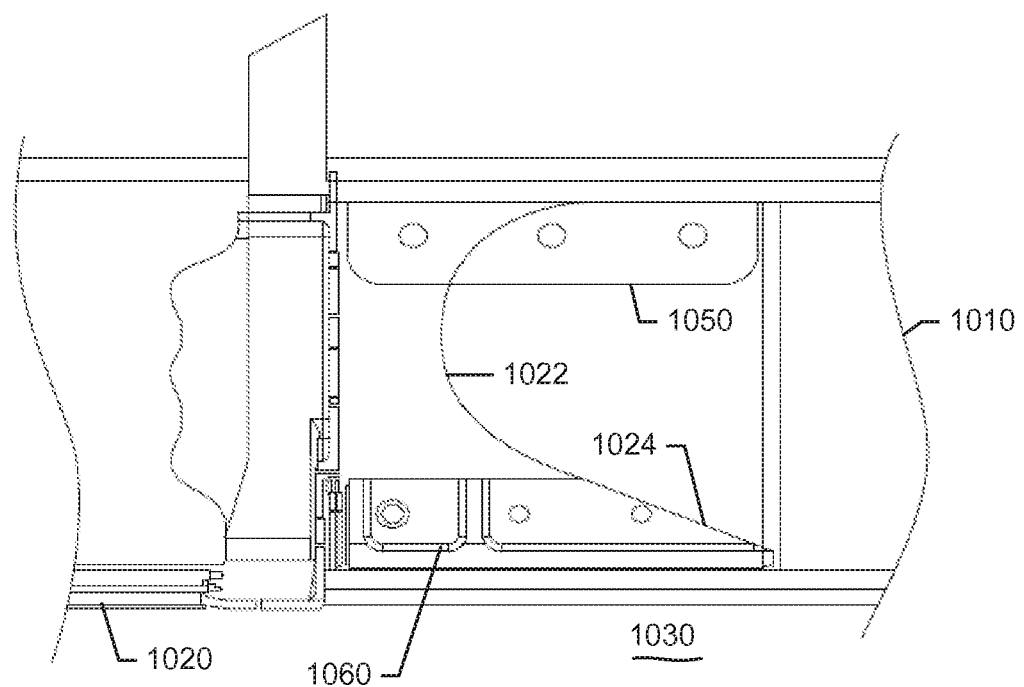
FIG. 10 is an illustration of a bulkhead frame and transverse beam of a fuselage.

Reference is now made to FIG. 10, which illustrates a fuselage 120 including a bulkhead frame 1010 and transverse beam 1020. Additional bulkhead frames 1010 and transverse beams 1020 of the fuselage 120 are not illustrated. A pressure deck 1030 is fastened to the transverse beams 1020.

Each transverse beam 1020 is joined to a bulkhead frame 1010 by a cap fitting 1050. Caps of the bulkhead frame 1010 and the transverse beam 1020 are fastened to the cap fitting 1050. The base of the transverse beam 1020 is fastened to a base fitting 1060. The transverse beam 1020 is shown as having a cutout 1022 and a tapered base 1024.

The invention claimed is:

1. A beam for an aircraft, the beam made of fiber-reinforced composites and comprising a base and a web; wherein:
the beam has a first end and a second end, where the first end and the second end extend in a spanwise direction;
the base and the web are elongate in the spanwise direction;
the first end comprises a web cutout with a taper formed in the base, wherein the taper tapers in the spanwise direction away from the web;
the taper is located at an end of the base;
the taper runs from a knife edge of the base to a full height of the base across an entirety of the base;
the taper of the base has an angle between 10 degrees and 15 degrees;
the taper of the base is contiguous with an edge of the web cutout; and
the base comprises an overwrap layer on the taper of the base.

2. A fuselage comprising a plurality of bulkhead frames, a plurality of beams according to claim 1, and a plurality of fittings for joining the ends of the beams to the bulkhead frames.

3. The beam according to claim 1, further comprising a cap elongate in the spanwise direction, wherein the web is between the cap and the base.

4. The beam according to claim 1, wherein the web cutout has a parabolic shape.

5. The beam according to claim 1, wherein the overwrap layer includes fiber-reinforced composite.

6. The beam according to claim 1, wherein corners of the base are rounded.

7. The beam according to claim 1, wherein the beam comprises back-to-back C-channel beams and noodles between the back-to-back C-channel beams, wherein the noodles are tapered to match the taper of the base.

8. The beam according to claim 7, wherein:
each of the back-to-back C-channel beams comprises a web portion;
the web portions of the back-to-back C-channel beams define the web of the beam; and
the web portions of the back-to-back C-channel beams are bonded together.

9. The beam according to claim 7, further comprising:
a cap elongate in the spanwise direction, wherein the web is between the cap and the base; and
a cap plate bonded to the cap.

10. The beam according to claim 7, further comprising a base plate bonded to the base.

11. The beam according to claim 1, wherein:
the web cutout extends in the spanwise direction from a first location to a second location along the beam;
the taper extends between a third location and a fourth location in the spanwise direction along the beam;
the taper is between the first location and the second location in the spanwise direction;
a first distance separates the second location and the fourth location in the spanwise direction;
a second distance separates the first location and the third location in the spanwise direction;
the third location is between the first location and the fourth location in the spanwise direction; and
the fourth location is between the third location and the second location in the spanwise direction.

12. The beam according to claim 1, wherein the web cutout extends beyond the end of the base in a direction extending from the second end of the beam towards the first end of the beam.

13. The beam according to claim 1, wherein the web cutout is semicircular.

14. The beam according to claim 1, wherein an entirety of the web cutout is concave.

15. The beam according to claim 1, wherein a curvature of the web cutout is compound.

16. The beam according to claim 1, wherein the taper is straight.

17. The beam according to claim 1, wherein the taper is radiused.

18. The beam according to claim 1, wherein the overwrap layer covers an entirety of the taper.

19. The beam according to claim 1, wherein the beam has an I-shaped cross-section.

20. The beam according to claim 1, wherein the beam has a T-shaped cross-section.

* * * * *